US008307274B2

(12) United States Patent
Chang et al.

(10) Patent No.: US 8,307,274 B2
(45) Date of Patent: Nov. 6, 2012

(54) METHOD FOR CONVERTING A COMPUTERIZED BRIEFING FILE TO A PC-LESS BRIEFING FILE AND BRIEFING SYSTEM FOR PRESENTING THE PC-LESS BRIEFING FILE

(75) Inventors: Kuo-Lung Chang, Junghe (TW); Yi-Ju Chen, Junghe (TW); Hsing-Yung Wang, Junghe (TW); Li-Chin Lin, Junghe (TW)

(73) Assignee: Awind Inc., Junghe (TW)

( * ) Notice: Subject to any disclaimer, the term of this patent is extended or adjusted under 35 U.S.C. 154(b) by 1110 days.

(21) Appl. No.: 12/180,599

(22) Filed: Jul. 28, 2008

(65) Prior Publication Data

US 2009/0265614 A1 Oct. 22, 2009

(30) Foreign Application Priority Data

Apr. 18, 2008 (TW) ................................ 97114037 A

(51) Int. Cl.
*G06F 17/00* (2006.01)
(52) U.S. Cl. ......... 715/202; 715/201; 715/204; 715/249
(58) Field of Classification Search .................. 715/201, 715/202, 204, 249
See application file for complete search history.

(56) References Cited

U.S. PATENT DOCUMENTS

| 6,369,835 | B1 * | 4/2002 | Lin ................................ 715/726 |
| 7,643,705 | B1 * | 1/2010 | Erol et al. ..................... 382/305 |
| 7,698,646 | B2 * | 4/2010 | Erol et al. ..................... 715/730 |
| 2005/0041872 | A1 * | 2/2005 | Yim et al. ..................... 382/232 |
| 2009/0029723 | A1 * | 1/2009 | Doyle et al. .................. 455/466 |

* cited by examiner

*Primary Examiner* — Adam M Queler
(74) *Attorney, Agent, or Firm* — Ming Chow; Sinorica, LLC

(57) ABSTRACT

A method for converting a computerized briefing file to a PC-less briefing file is disclosed and comprises the steps of: presenting the computerized briefing file via a briefing software, wherein the computerized briefing file has a plurality of pages of briefing data; capturing the plurality of frames of the presented page of briefing data while presenting each page of briefing data, wherein if a difference block is existed between the last frame and the next frame, the difference block being stored in the PC-less file, otherwise, to presenting the next frame; judging whether the pagination of the presented frame is changed or not, if not, continuously capturing, comparing and storing the present page of briefing data, otherwise, capturing, comparing and storing the next page of briefing data; and such steps are not stopped until the last page of briefing data has being done.

5 Claims, 5 Drawing Sheets

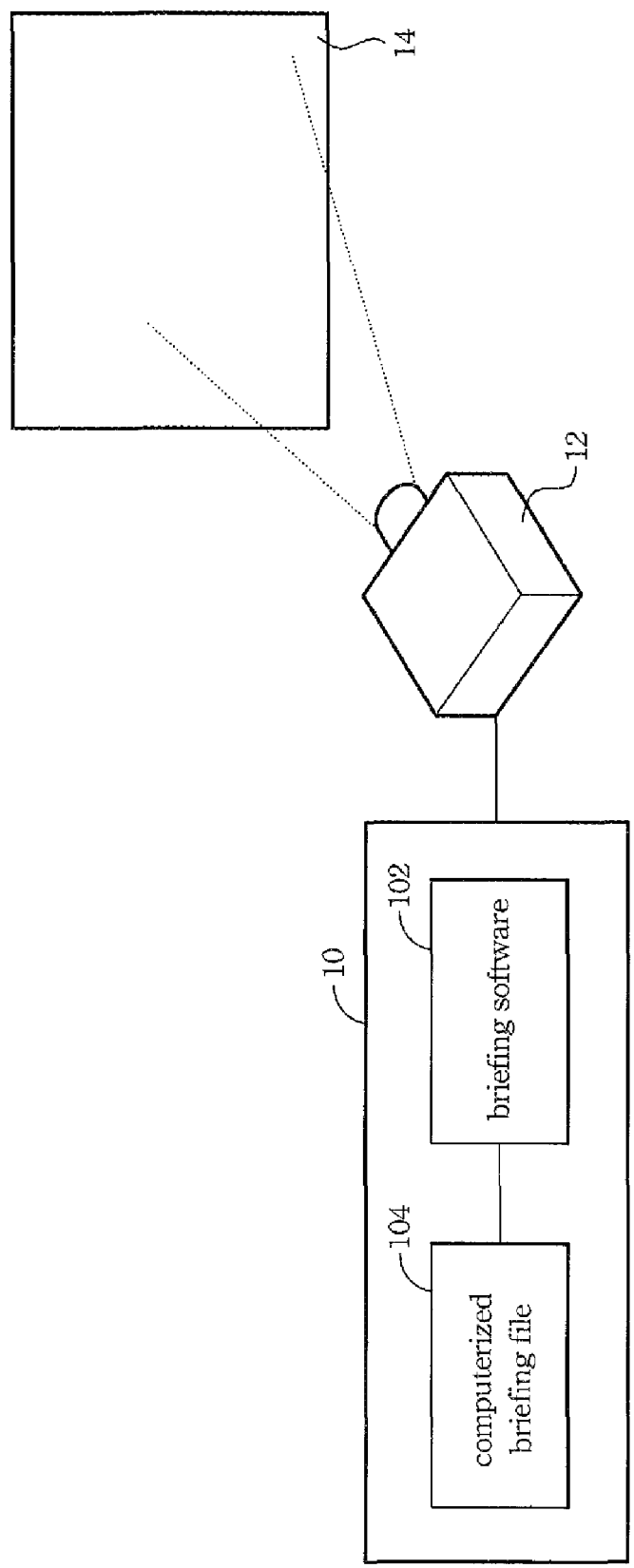
F I G. 1

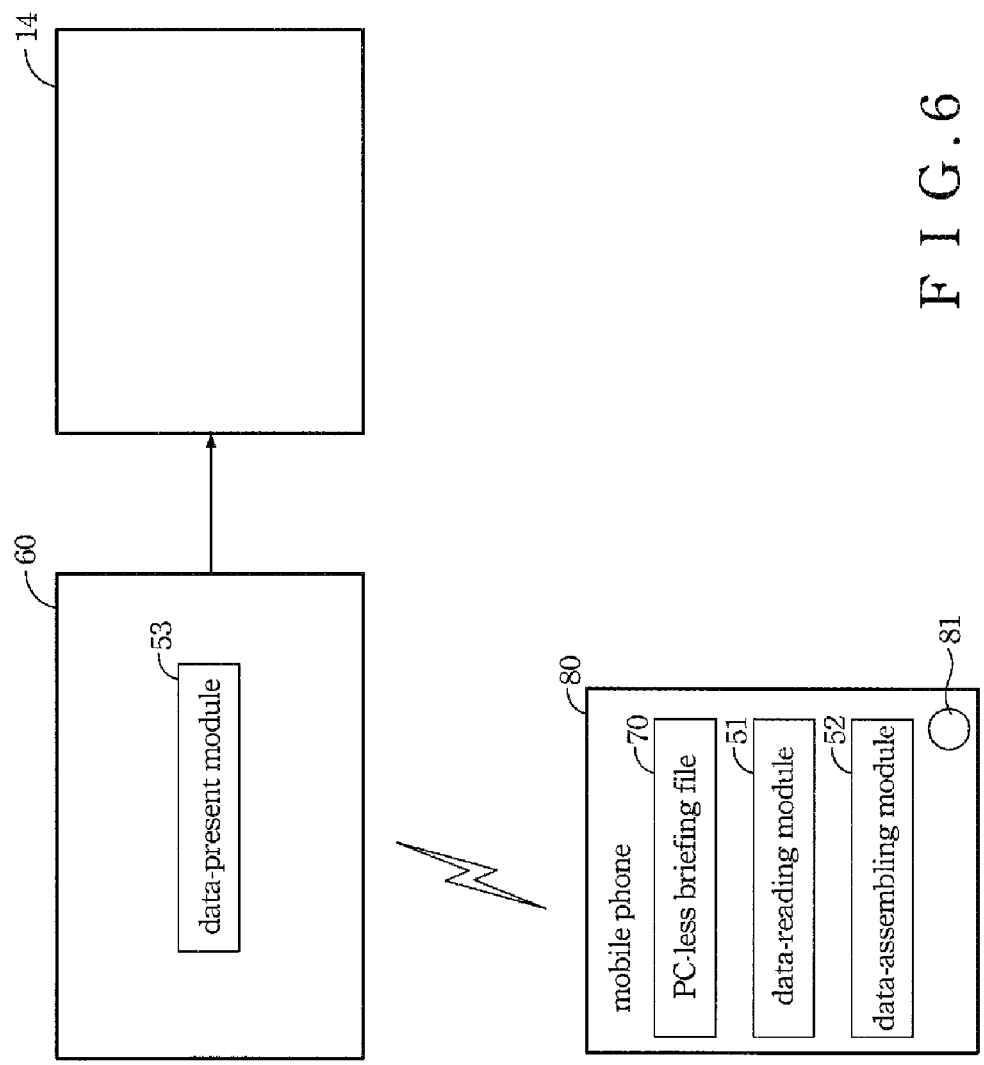

METHOD FOR CONVERTING A COMPUTERIZED BRIEFING FILE TO A PC-LESS BRIEFING FILE AND BRIEFING SYSTEM FOR PRESENTING THE PC-LESS BRIEFING FILE

BACKGROUND OF THE INVENTION

1. Field of the Invention

The present invention generally relates to a method for converting a computerized briefing file to a PC-less briefing file and a briefing system for presenting the PC-less briefing file.

2. Description of the Prior Art

With reference to FIG. 1, which illustrates a schematic structural view of a system of using computers to have a briefing meeting in prior arts. As shown in FIG. 1, there is a computer 10, a projection device 12 and a screen 14. A briefing software 102, such as PowerPoint®, is installed on the computer 10, and a computerized briefing file 104 is presented by the briefing software 102. The computer 10 communicates with the projection device 12 through a wire or wireless connection in order to transmit the frame that appears on the display of the computer 10 to the projection device 12, and then to the screen 14.

The computer 10 in the meeting room mainly functions to present the computerized briefing file 104. If the meeting is not held very often, the computer 10 stays in the meeting room all the time, which is a waste of office resources; on the other hand, without the computer 10 may cause an inconvenience while in meeting.

With reference to FIG. 2, which illustrates a schematic view of a projection device with a USB slot in prior arts. To figure out the inconvenience mentioned in FIG. 1, FIG. 2 discloses the projection device with the USB slot, and the projection device includes a body 20, a USB slot 22 and an image-present module 24. When the USB slot 22 is combined with a detachable device 26, the image-present module 24 reads and presents an image file 28, such as JPG format, stored in the detachable device 26. Since the image-present module 24 can only present the image file 28, the detachable device 26 can then only store images while connected to the image-present module 24, but cannot store a computerized briefing file, such as a PowerPoint® file.

Take PowerPoint® as an example, its computerized briefing file usually has a plurality of pages of briefing data. Each page of briefing data may be a picture, an animation, or the assembly of them. Besides, switching the previous page to the following page may need transition effects. Thus, to present the animation or the following page of briefing data, the speaker should input an enter commandnext command to execute through the PowerPoint® in computer.

The projection device in FIG. 2 only presents the image file, therefore the computerized briefing file of PowerPoint® must be converted to several image files and stored in a file folder. For instance, the computerized briefing file has 12 pages of briefing data, the 12 pages are converted to 12 image files. Meanwhile, the animation effects of each page of briefing data and the transition effects for changing different pages of briefing data are not transferred to the image files. Even though the speaker is able to present the computerized briefing file without the computer, the original effects from PowerPoint® are lost.

Besides, while several image files are stored in a file folder of a detachable device, the name of the file folder appears in a format of character code but not a format of image, and different regions or countries may not have the same character code. If the speaker makes the presentation in other regions or countries that do not support the character code of the file folder, then the file folder of the detachable device may not be recognized. Thus, when there are too many file folders to remember without their proper names, the speaker needs to open those file folders one by one to identify the proper file folder. This is an inconvenience.

To solve the shortcomings from the prior arts, a method for converting a computerized briefing file to a PC-less briefing file is provided, and the briefing file can be presented without a computer. Besides, the functions and effects are still kept in the PC-less briefing file, so that the convenience for meeting is highly increased.

SUMMARY OF THE INVENTION

The primary objective of the present invention is to provide a method for converting a computerized briefing file to a PC-less briefing file.

The other objective of the present invention is to provide a briefing system for presenting the PC-less briefing file.

To approach above objectives, the present invention discloses the method for converting the computerized briefing file to the PC-less briefing file. Through the method, the computerized briefing file only presented by a computer may be converted to a briefing file, which is presented without a computer. The computerized briefing file comprises a plurality of pages of briefing data, and each page of the briefing data has at least one frame.

The method of the present invention comprises the steps of: (a) executing the present command of a briefing software in order to present the computerized briefing file; (b) presenting the frame of the $N^{th}$ page of the briefing data Sn by using the briefing software; (c) capturing the plurality of frames Fi within a time period T, and noting a pause mark to the first captured frame Fi, then storing the first captured frame Fi into the PC-less briefing file; (d) comparing the frame Fi with the next frame $F_{i+1}$ in order, so as to judge whether a difference block Di is existed or not, if yes, the difference block Di, a marked position Pi, and a capturing time period Ti being stored in the PC-less briefing file, otherwise, going to the next step; (e) executing the next command (or enter command) of the briefing software so as to change to the next frame Fm; (f) judging whether the pagination of the frame Fm is changed or not, if not, i=m+i and executing step (c), if yes, going to the next step; (g) judging whether the pagination of the frame is the last page or not, if not, setting N=N+1 and going to step (b), otherwise, the frame Fm being stored in the PC-less briefing file, and ending.

Wherein the briefing software is Microsoft® PowerPoint®, and the computerized briefing file is presented by a supported automation method. The presentation is started from the first page (n=1) of the briefing data Sn by using the briefing software, and the presented frame is stored in a memory in a bitmap format.

Besides, while presenting the computerized briefing file, the filename thereof is first read and then stored in the PC-less briefing file in a bitmap format. Step (b) further comprises the step of: storing the pagination of the $N^{th}$ page of the briefing data Sn and the first presented frame into the PC-less briefing file in a thumbnail format.

As mentioned above, the PC-less briefing file converted by the present invention comprises the following points of:

1. storing the filename in the bitmap format;
2. storing the first frame and the pagination of each page of the briefing data in the bitmap format to be as a presented index;

3. noting a pause mark to a first captured frame Fi within every time period T; and
4. the difference block Di between a previous frame and a next frame, the marked position Pi, and the capturing time period Ti.

The briefing system of the present invention comprises a data-reading module, a data-assembling module, and a data-presenting module. The data-reading module reads the plurality of frames of the PC-less briefing file, and each of the partial frames is noted either with the pause mark or without the pause mark. The data-assembling module recovers the frames without noting pause marks by using the difference block Di and the marked position Pi. The data-presenting module presents the frames in order so that the frames are presented every capturing time period Ti, wherein if the presented frame has the pause mark, then the next frame is presented after receiving the next command (or enter command).

The briefing system of the present invention can be disposed in a projection device, which has a USB slot. The PC-less briefing file is stored in a USB flash drive. After inserting the USB flash drive into the USB slot of the projection device, the data-reading module reads all of the files on the USB flash drive, and all of the filenames for each file are projected on a screen. The filename of the briefing data of the PC-less briefing file is stored in the bitmap format, which prevents the filename from not being recognized in different regions.

The speaker may select one of the PC-less briefing file for the presentation, and the method of the presentation comprises the steps of: (a) directly presenting the briefing file and (b) entering the index to select one page of the briefing data in the thumbnail format.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 1 illustrates a schematic structural view of a system that uses computers to have a briefing meeting in prior arts;

FIG. 6 illustrates a schematic view of a second preferred embodiment of the briefing system for presenting the PC-less briefing file with the present invention.

DETAILED DESCRIPTION OF THE INVENTION

Figure 2:
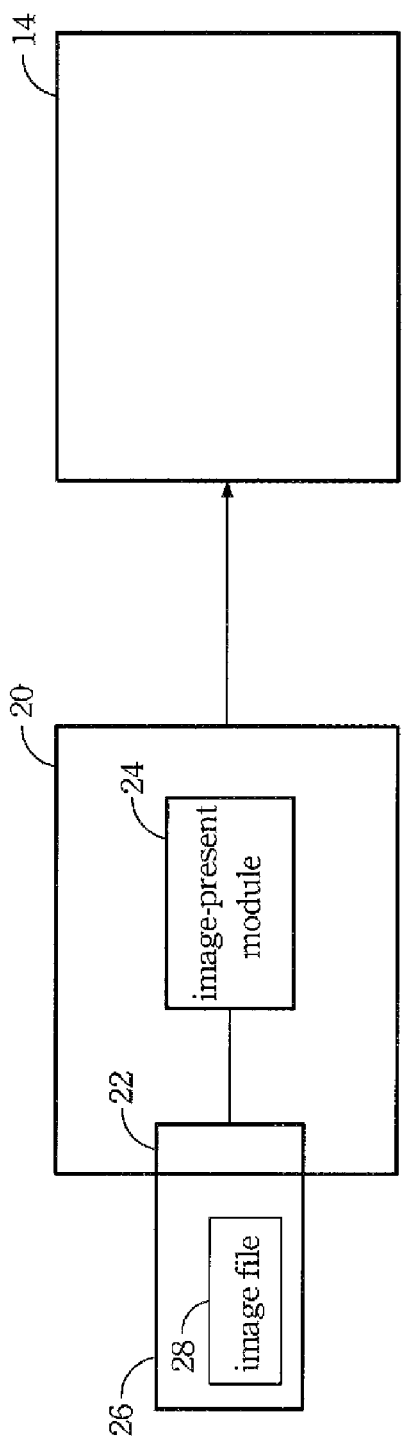
FIG. 2 illustrates a schematic view of a projection device with a USB slot in prior arts.
Figure 3:
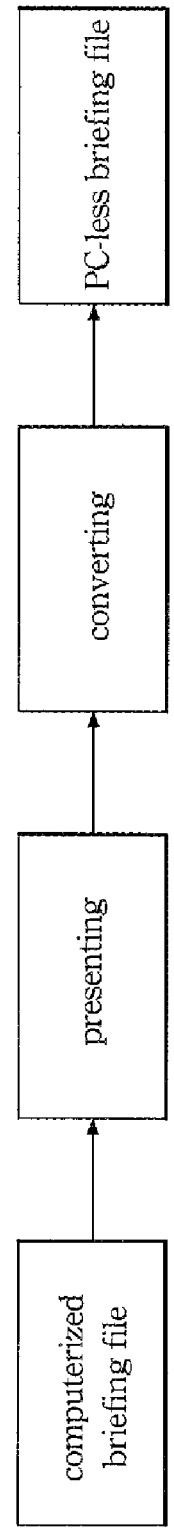
FIG. 3 illustrates a schematic view of converting a computerized briefing file to a PC-less briefing file with the present invention.

With reference to FIG. 3, which illustrates a schematic view of converting a computerized briefing file to a PC-less briefing file with the present invention. The present invention first presents a computerized briefing file via a computerized briefing software and converts the computerized briefing file to a PC-less briefing file during the presentation. While the computerized briefing file is being presented, the window for presentation is moved out of the display area of the computer, so that the display area of the computer can be used for other operations.

The preferred embodiment of the present invention adopts PowerPoint® as the briefing software, and the computerized briefing file is called PowerPoint® file. The computerized briefing file comprises a plurality of pages of briefing data, and each page has at least one frame.

Figure 4:
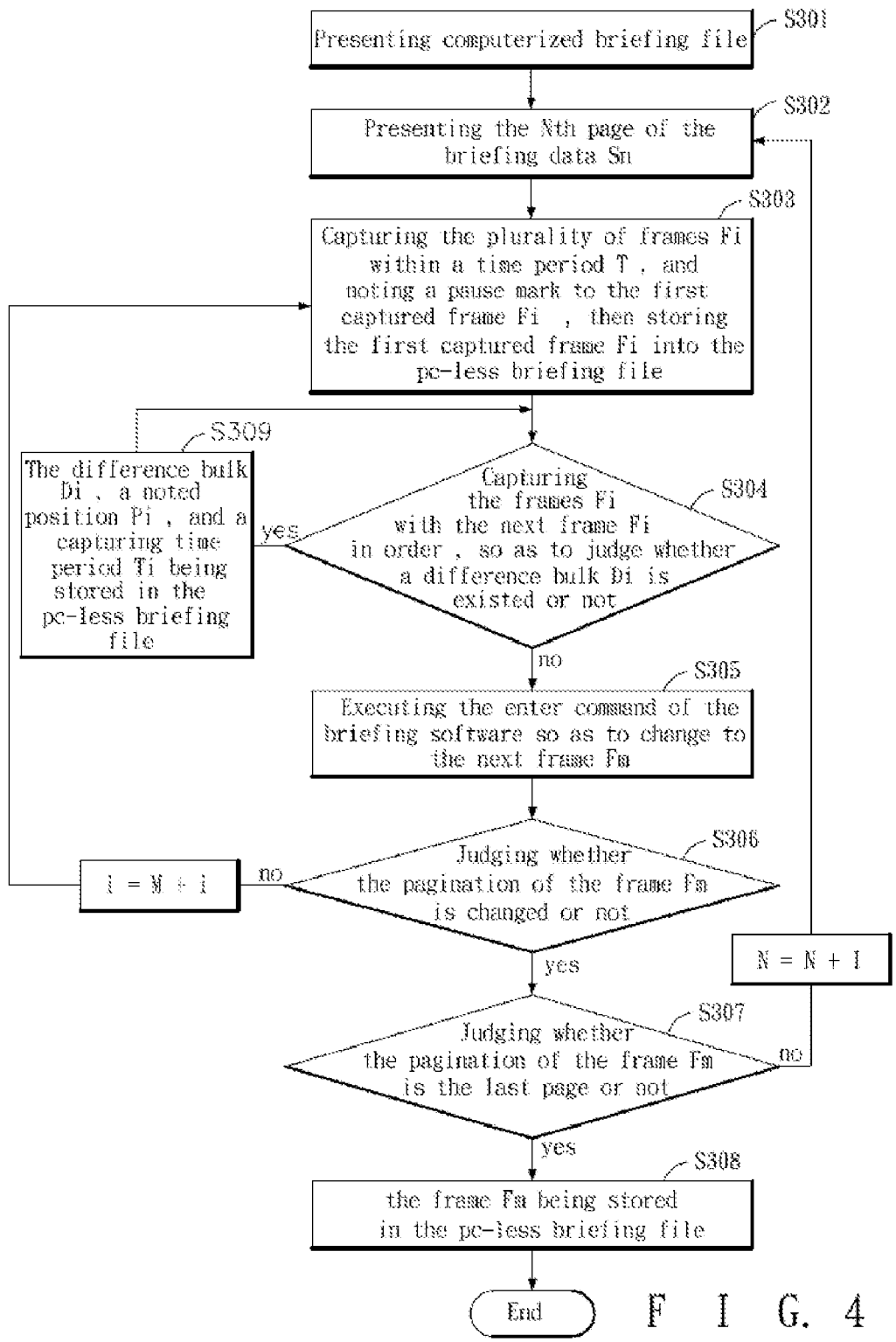
FIG. 4 illustrates a flow chart of converting a computerized briefing file to a PC-less briefing file with the present invention.

With reference to FIG. 4, which illustrates a flow chart of converting a computerized briefing file to a PC-less briefing file of the present invention. The flow chart includes the steps of: (S301) executing the present command of a briefing software in order to present the computerized briefing file; (S302) presenting the frame of the $N^{th}$ page of the briefing data Sn by using the briefing software; (S303) capturing the plurality of frames Fi within a time period T, and noting a pause mark to the first captured frame Fi, then storing the first captured frame Fi into the PC-less briefing file; (S304) comparing the frame Fi with the next frame $F_{i+1}$ in order, so as to judge whether a difference block Di is existed or not, if yes, (309) the difference block Di, a marked position Pi, and a capturing time period Ti being stored in the PC-less briefing file, otherwise, going to the next step; (305) executing the next command (or enter command) of the briefing software so as to change to the next frame Fm; (306) judging whether the pagination of the frame Fm is changed or not, if not, i=m+i and executing step (5303), if yes, going to the next step; (S307) judging whether the pagination of the frame Fm is the last page or not, if not, N=N+1 and going to step (S302), otherwise, the frame Fm being stored in the PC-less briefing file; and (S308) ending.

Since Microsoft® PowerPoint® (or Apple Keynote) itself has the function of supported automation method, once the function is activated, the presentation is automatically started from the first page (n=1) of the briefing data Sn, and all of the presented frames are stored in a memory in a bitmap format.

Besides, in step (S301), while presenting the computerized briefing file, the filename thereof is read first and then stored in the PC-less briefing file in a bitmap format. In step (S302), the pagination of the $N^{th}$ page of the briefing data Sn and the first presented frame are stored into the PC-less briefing file in a thumbnail format.

As mentioned above, the PC-less briefing file converted by the present invention comprises the following points of:
1. storing the filename in the bitmap format;
2. storing the first frame and the pagination of each page of the briefing data in the bitmap format to be as a presented presenting index;
3. noting a pause mark to a first captured frame Fi within every time period T; and
4. the difference block Di between a previous frame and a next frame, the marked position Pi, and the capturing time period Ti.

Figure 5:
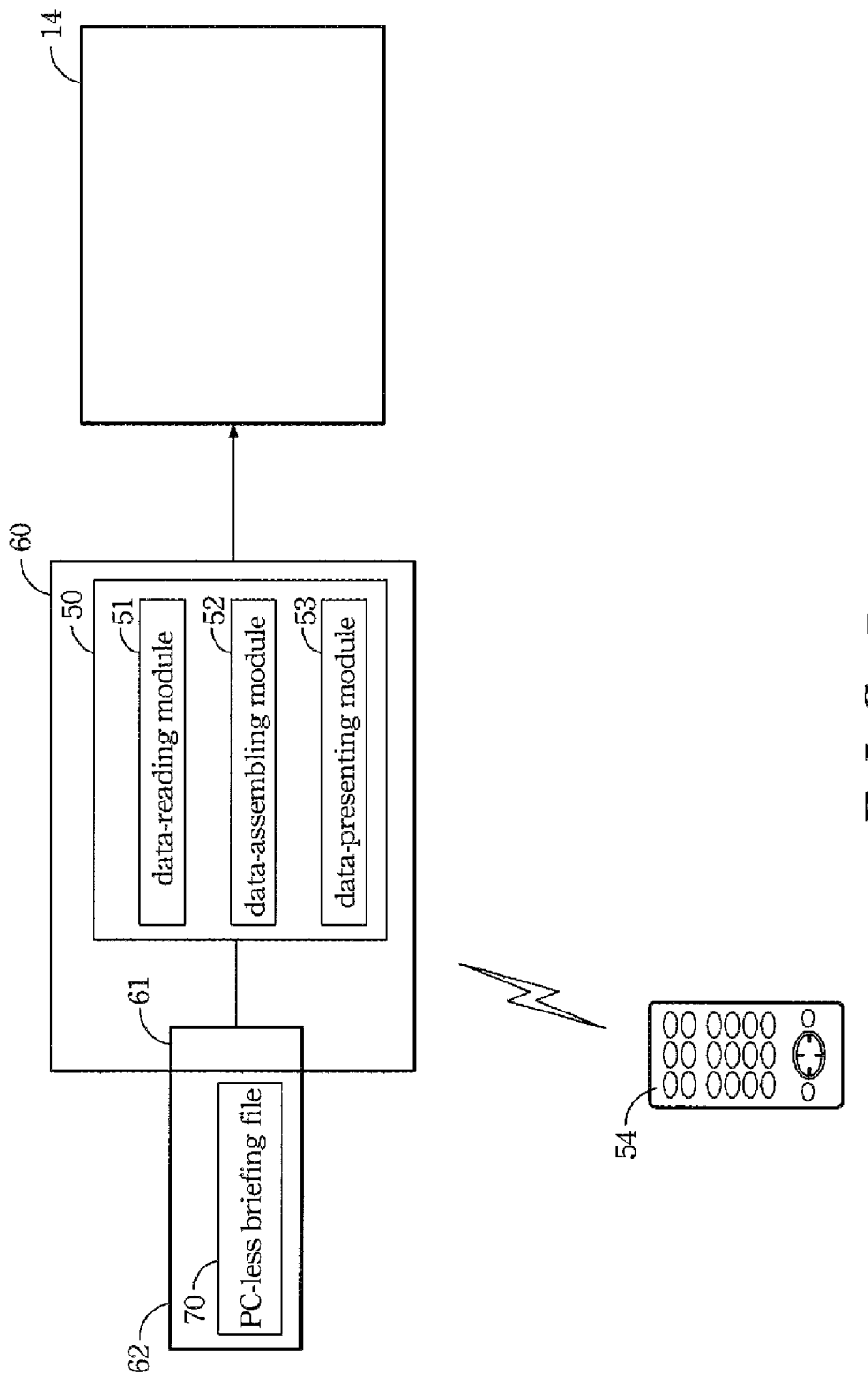
FIG. 5 illustrates a schematic view of a first preferred embodiment of a briefing system for presenting the PC-less briefing file with the present invention.

With reference to FIG. 5, which illustrates a schematic view of a first preferred embodiment of a briefing system for presenting the PC-less briefing file of the present invention. The briefing system 50 of the present invention includes a data-reading module 51, a data-assembling module 52, and a data-presenting module 53. The briefing system 50 is embedded in a projection device 60 or a sole device that connects to the projection device 60. In the preferred embodiment, the briefing system 50 is embedded in the projection device 60, which has a USB slot 61. Hence, a PC-less briefing file 70 is only stored on a USB flash drive 62 or an detachable device and can then be presented through the combination of the USB slot 61 and the projection device 60.

The data-read module 51 reads the plurality of frames of the PC-less briefing file 70, and each of the partial frames is noted either with or without the pause mark. The data-assemble module 52 recovers the frames without noting pause marks by using the difference block Di and the marked position Pi. The data-present module 53 presents the frames in order so that the frames are presented every capturing time period Ti, wherein if the presented frame has the pause mark, the next frame is presented after receiving the next command (or enter command).

When the USB flash drive 62 is inserted into the USB slot 61 of the projection device 60, the data-read module 51 reads all of the files of the USB flash drive 62, and all of the filenames of the files are projected on a screen 14. The filename of the briefing data of the PC-less briefing file is stored in the bitmap format, which prevents the filename from not being recognized in different regions.

The speaker may select one of the PC-less briefing files for the presentation, and the method of the presentation comprises the steps of: (a) directly presenting the briefing file; and (b) entering the presenting index to select one page of the briefing data in the thumbnail format.

The example of directly presenting the briefing file is described as below. The data-read module reads the plurality of frames of the PC-less briefing file in order. If the read frame is noted with the pause mark, it means that the read frame must be the first frame of each page of the briefing data or the first frame that is presented after the presentation of an animation. If such frames are noted with pause marks, the data-present module may present the next frame after receiving the next command (or enter command). If the read frame is not noted with the pause mark and has the difference block Di, the marked position Pi, the capturing time period Ti, etc., then the frame is a dynamic frame during the presentation and must be recovered by the data-assemble module. The data-present module presents the frame within the capturing time period Ti and may not stop until all the frames are presented.

In the case of presenting one page of the briefing data, the presenting index must be entered first. Then one page of the briefing data in the thumbnail format is selected to present. The steps of the presentation are the same as the aforementioned.

It is to be noted, the briefing system further includes a remote control 54, as shown in FIG. 5. The remote control 54 has at least the functional buttons of last page, next page, number, and switch, etc. in order to control the briefing system 50 for executing the PC-less briefing file.

With reference to FIG. 6, which illustrates a schematic view of a second preferred embodiment of the briefing system for presenting the PC-less briefing file of the present invention. As shown in FIG. 6, there are a mobile phone 80, a projection 60 and a screen 14.

The mobile phone 80 has a data-read module 51, a data-assemble module 52 and a PC-less briefing file 70, wherein the converted PC-less briefing file 70 can be stored in the mobile phone 80 by way of wire or wireless. The data-read module 51 reads the plurality of frames of the PC-less briefing file 80, and each of partial frames is noted either with or without the pause mark. The data-assemble module 52 recovers the frames without noting pause marks by using the difference block Di and the marked position Pi.

The projection device 60 has a data-present module 53 and wirelessly communicates to the mobile phone 80. The data-present module 53 presents the frames in order and outputs the frames to the screen 14, wherein if the presented frame has the pause mark, the next frame is presented after receiving the next command (or enter command). The mobile phone 80 also has a button 81 to output the next command (enter command).

The presentation of the second preferred embodiment is almost similar to the first preferred embodiment; the most significant differences between the two embodiments is that the briefing system of the first preferred embodiment is combined with the projection device, that the PC-less briefing file is stored on the USB flash drive, and that the speaker uses the remote control to handle the briefing system. For the second preferred embodiment, the PC-less briefing file is stored on the mobile phone, and the PC-less briefing file is read and assembled in the mobile phone. At last, the assembled PC-less briefing file is delivered to the data-present module of the projection device for presentation. The speaker presents the file through the mobile phone without the remote control or the USB flash drive.

It is to be noted that the data-read module is embedded in the mobile phone for the second preferred embodiment. The data-present module is embedded in the projection device. The data-read module has the function of reading the plurality of frames of the PC-less briefing data and judging whether the frame is noted with the pause mark or not, and therefore the judgment for the pause mark is controlled by the data-present module of the mobile phone. The speaker controls the presentation of the PC-less briefing data through pressing the button of the mobile phone to output the next command (enter command). The data-present module of the projection device may not need to judge whether the frame is noted with the pause mark or not, and all that the data-present module has to do is to output the frame to the screen after receiving the frame from the mobile phone.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for converting a computerized briefing file to a PC-less briefing file, wherein the computerized briefing file comprises a plurality of pages of briefing data, each page of the briefing data comprises at least one frame, and comprising the steps of:
   (a) executing the present command of a briefing software in order to present the computerized briefing file;
   (b) presenting the frame of the Nth page of the briefing data Sn by using the briefing software;
   (c) capturing the plurality of frames Fi within a time period T, and noting a pause mark to the first captured frame Fi, then storing the first captured frame Fi into the PC-less briefing file;
   (d) comparing the frame Fi with the next frame Fi+1 in order, so as to judge whether a difference block Di is existed or not, if yes, the difference block Di, a marked position Pi, and a capturing time period Ti being stored in the PC-less briefing file, otherwise, going to the next step;
   (e) executing the next command of the briefing software so as to present the next frame Fm;

(f) judging whether the pagination of the frame Fm is changed or not, if not, i=m+i and executing step (c), if yes, going to the next step; and (g) judging whether the pagination of the frame Fm is the last page or not, if not, N=N+1 and going to step (b), otherwise, the frame Fm being stored in the PC-less briefing file, and ending.

2. The method according to claim 1, wherein the computerized briefing file is presented by a supported automation method.

3. The method according to claim 1, wherein the presented frame in step (b) is stored in a memory in a bitmap format.

4. The method according to claim 1, wherein step (b) further comprises the step of: storing the pagination of the $N^{th}$ page of the briefing data Sn and the first presented frame into the PC-less briefing file in a thumbnail format.

5. The method according to claim 1, wherein before presenting the computerized briefing file of step (a), the filename of the computerized briefing file is read and then stored in the PC-less briefing file in a bitmap format.

* * * * *